US012675802B2

(12) United States Patent
Sun et al.

(10) Patent No.: US 12,675,802 B2
(45) Date of Patent: Jul. 7, 2026

(54) SYSTEMS AND METHODS FOR MULTI-MARKET BROWSE FACET MAPPING AND RANKING USING MACHINE LEARNING

(71) Applicant: Walmart Apollo, LLC, Bentonville, AR (US)

(72) Inventors: Yijie Sun, Santa Clara, CA (US); Chittaranjan Tripathy, Sunnyvale, CA (US); Asheem Sinha, Sammamish, WA (US); Nita Malani, Thornhill (CA)

(73) Assignee: Walmart Apollo, LLC, Bentonville, AR (US)

( * ) Notice: Subject to any disclaimer, the term of this patent is extended or adjusted under 35 U.S.C. 154(b) by 219 days.

(21) Appl. No.: 18/425,652

(22) Filed: Jan. 29, 2024

(65) Prior Publication Data

US 2024/0257202 A1 Aug. 1, 2024

Related U.S. Application Data

(60) Provisional application No. 63/442,012, filed on Jan. 30, 2023.

(51) Int. Cl.
*G06Q 30/0201* (2023.01)
(52) U.S. Cl.
CPC ................................ *G06Q 30/0201* (2013.01)
(58) Field of Classification Search
USPC ........................................................ 705/7.29
See application file for complete search history.

(56) References Cited

U.S. PATENT DOCUMENTS

| | | | |
|---|---|---|---|
| 10,410,261 B2 * | 9/2019 | Siddiqui | ............ G06Q 30/0201 |
| 2012/0030152 A1 * | 2/2012 | Pueyo | ................ G06F 16/3331 |
| | | | 707/723 |
| 2012/0240236 A1 * | 9/2012 | Wyatt | .................... G06F 21/10 |
| | | | 726/25 |
| 2016/0267086 A1 * | 9/2016 | Liden | ................ G06F 16/24578 |

(Continued)

OTHER PUBLICATIONS

Dou et al., Automatically Mining Facets for Queries from Their Search Results, IEEE (Year: 2015).*

*Primary Examiner* — Allison M Neal
(74) *Attorney, Agent, or Firm* — DICKISON WRIGHT RLLP; Hector A. Agdeppa

(57) ABSTRACT

Systems and methods including one or more processors and one or more non-transitory storage devices storing computing instructions configured to run on the one or more processors and perform: receiving a first set of facet information corresponding to a first marketplace; receiving a second set of facet information corresponding to a second marketplace; analyzing the first set of facet information to reduce a number of attributes to process; building a machine learning model to map candidate facets from the first set of facet information to facets from the second set of facet information; training the machine learning model based on the first set of facet information, the second set of facet information, and the mapping of candidate facets from the first set of facet information to facets from the second set of facet information; and displaying a selected number of re-ranked facets based on an output from the machine learning model. Other embodiments are disclosed herein.

20 Claims, 9 Drawing Sheets

<u>400</u>

410 – Receiving a first set of facet information corresponding to a first marketplace and a second set of facet information corresponding to a second marketplace 420 – Analyzing the first set of facet information to reduce a number of attributes to process 430 – Building a machine learning model to map candidate facets from the first set of facet information to facets from the second set of facet information 440 – Training the machine learning model to perform facet ranking 450 – Displaying a selected number of re-ranked facets based on an output from the machine learning model

(56)                    References Cited

U.S. PATENT DOCUMENTS

2017/0061015 A1*  3/2017  Gungor ............... G06F 16/9538
2017/0124619 A1*  5/2017  Abhishek ........... G06Q 30/0629
2020/0233873 A1*  7/2020  Kamotsky ................ G06N 3/09
2021/0326346 A1*  10/2021  Rivlin .................... G06N 5/022

* cited by examiner

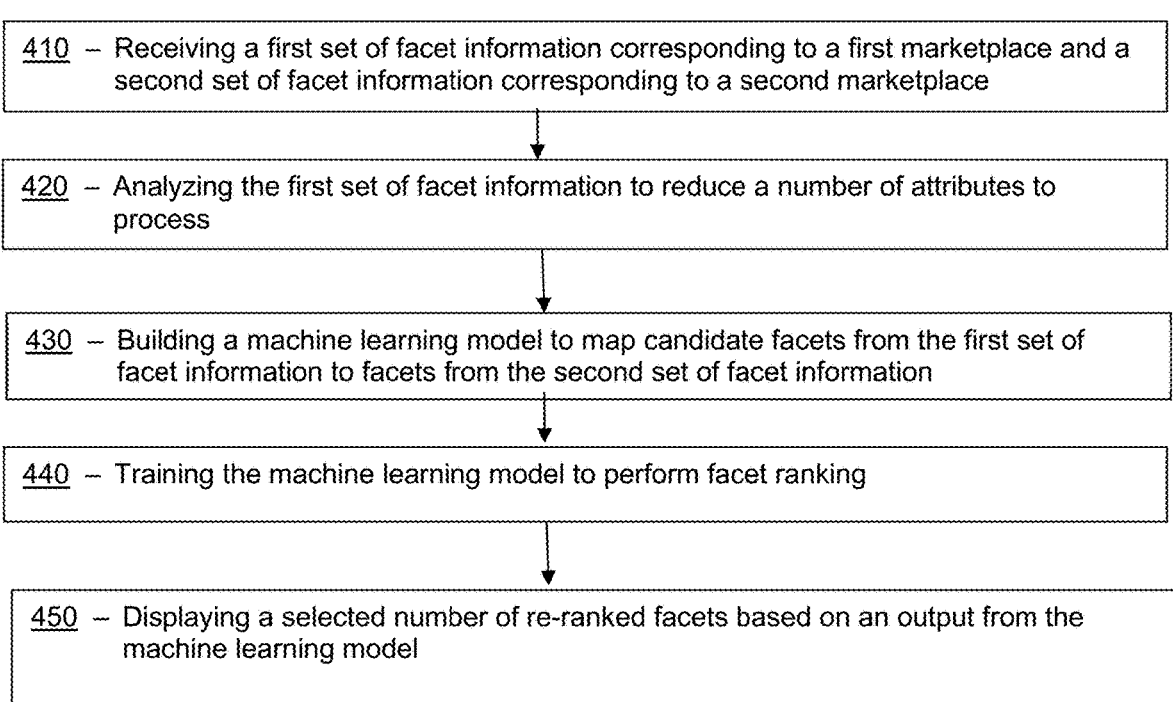

400

410 – Receiving a first set of facet information corresponding to a first marketplace and a second set of facet information corresponding to a second marketplace 420 – Analyzing the first set of facet information to reduce a number of attributes to process 430 – Building a machine learning model to map candidate facets from the first set of facet information to facets from the second set of facet information 440 – Training the machine learning model to perform facet ranking 450 – Displaying a selected number of re-ranked facets based on an output from the machine learning model

FIG. 4

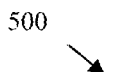
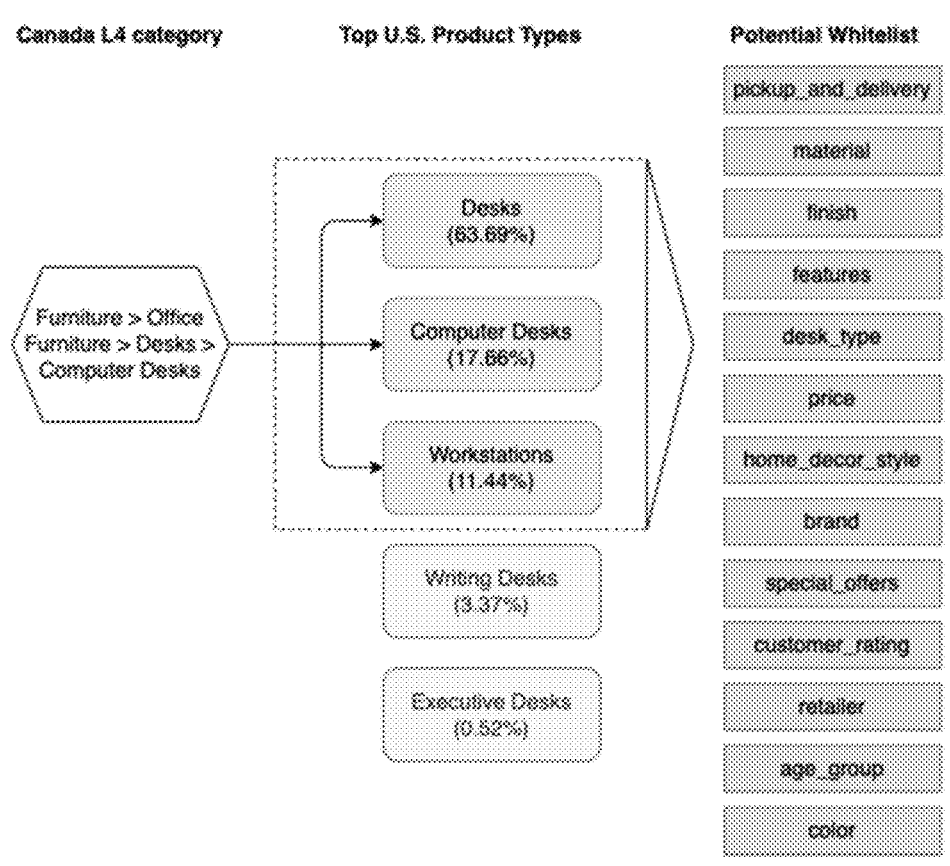
FIG. 5

600

602

900

1

SYSTEMS AND METHODS FOR MULTI-MARKET BROWSE FACET MAPPING AND RANKING USING MACHINE LEARNING

CROSS-REFERENCE TO RELATED APPLICATIONS

This application claims priority to U.S. Provisional Patent Application No. 63/442,012, filed Jan. 30, 2023. U.S. Provisional Patent Application No. 63/442,012 is incorporated herein by reference in its entirety.

TECHNICAL FIELD

This disclosure relates generally to computing system management, and more particular to systems and methods for multi-market browse facet mapping and ranking using machine learning.

BACKGROUND

Marketplaces are responsible for millions of products at a time. With so many products offered for sale, it can be difficult for a customer to find a desired product through a search. Many marketplaces offer free-form text searches of their product databases. However, the large number of products available provides many opportunities for matching a user with irrelevant products.

BRIEF DESCRIPTION OF THE DRAWINGS

To facilitate further description of the embodiments, the following drawings are provided in which:

FIG. 4 illustrates a flowchart for a method, according to certain embodiments;

FIG. 5 illustrates an exemplary data relationship, according to certain embodiments;

Figure 1:
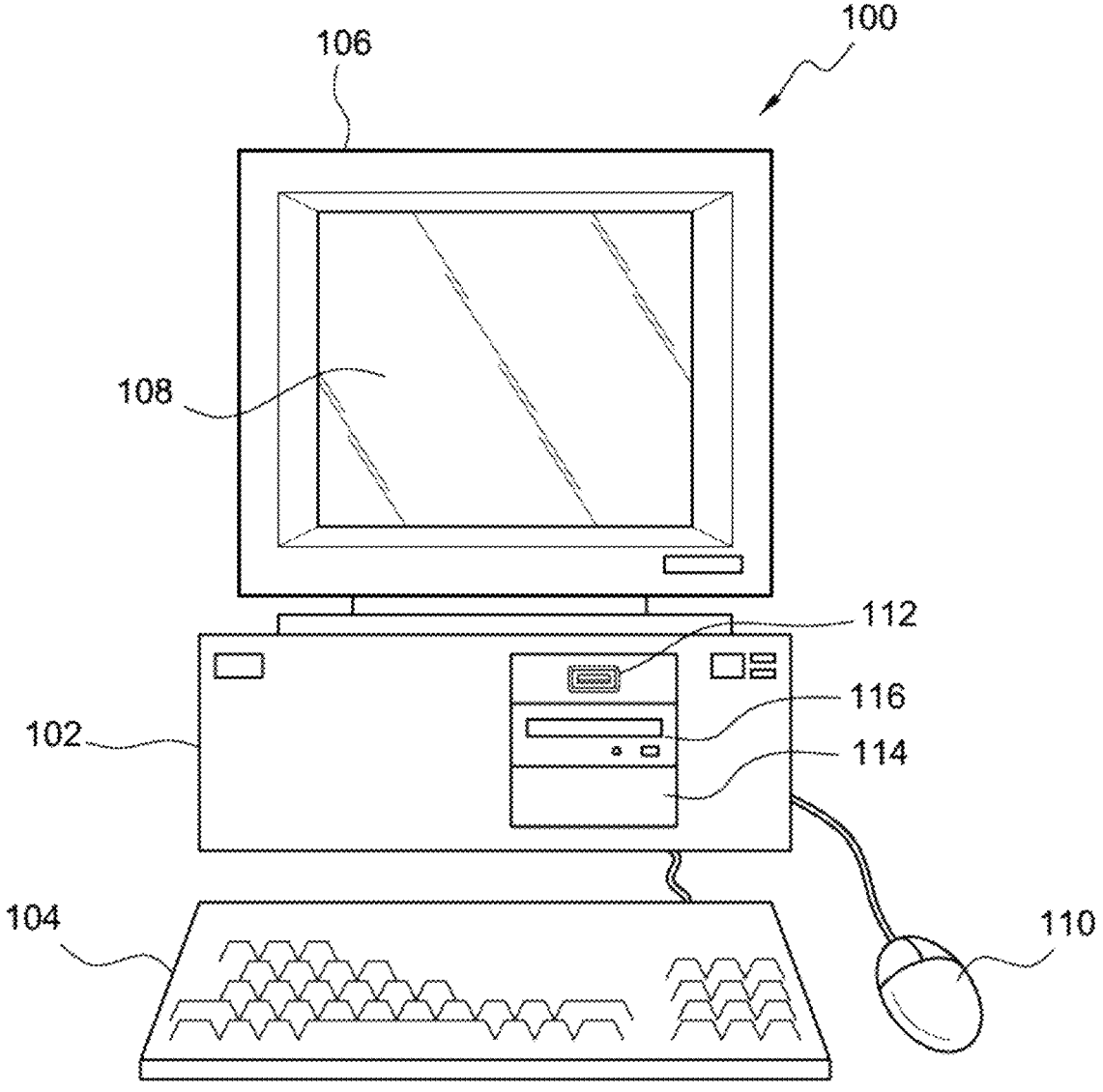
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform: receiving a first set of facet information corresponding to a first marketplace; receiving a second set of facet information corresponding to a second marketplace; analyzing the first set of facet information to reduce a number of attributes to process; building a machine learning model to map candidate facets from the first set of facet information to facets from the second set of facet information; training the machine learning model based on the first set of facet information, the second set of facet information, and the mapping of candidate facets from the first set of facet information to facets from the second set of facet information; and displaying a selected number of re-ranked facets based on an output from the machine learning model.

Various embodiments include a method. The method can be implemented via execution of computing instructions configured to run at one or more processors and configured to be stored at non-transitory computer-readable media. The method can comprise receiving a first set of facet information corresponding to a first marketplace; receiving a second set of facet information corresponding to a second marketplace; analyzing the first set of facet information to reduce a number of attributes to process; building a machine learning model to map candidate facets from the first set of facet information to facets from the second set of facet information; training the machine learning model based on the first set of facet information, the second set of facet information, and the mapping of candidate facets from the first set of facet information to facets from the second set of facet information; and displaying a selected number of re-ranked facets based on an output from the machine learning model.

Figure 2:
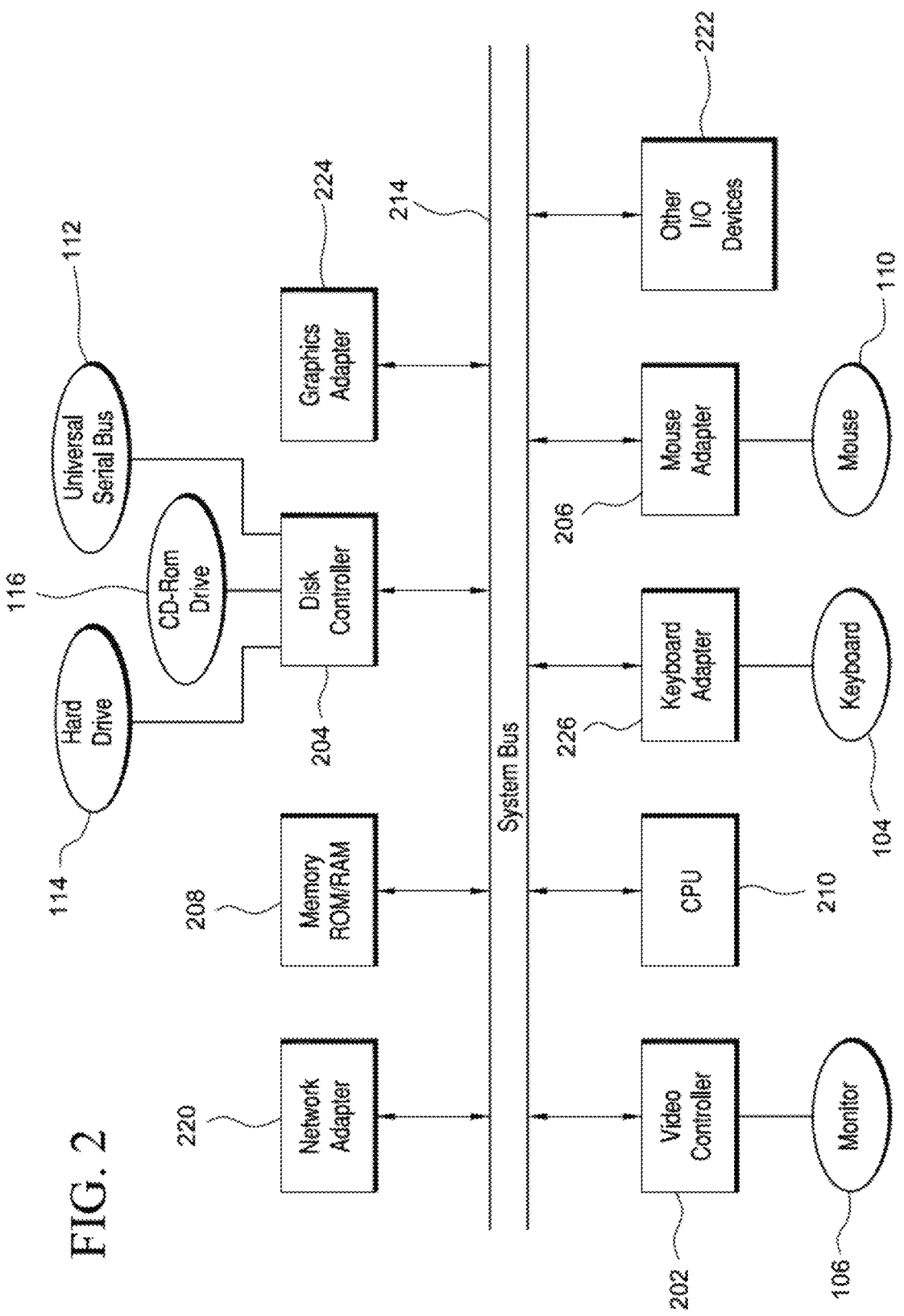
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
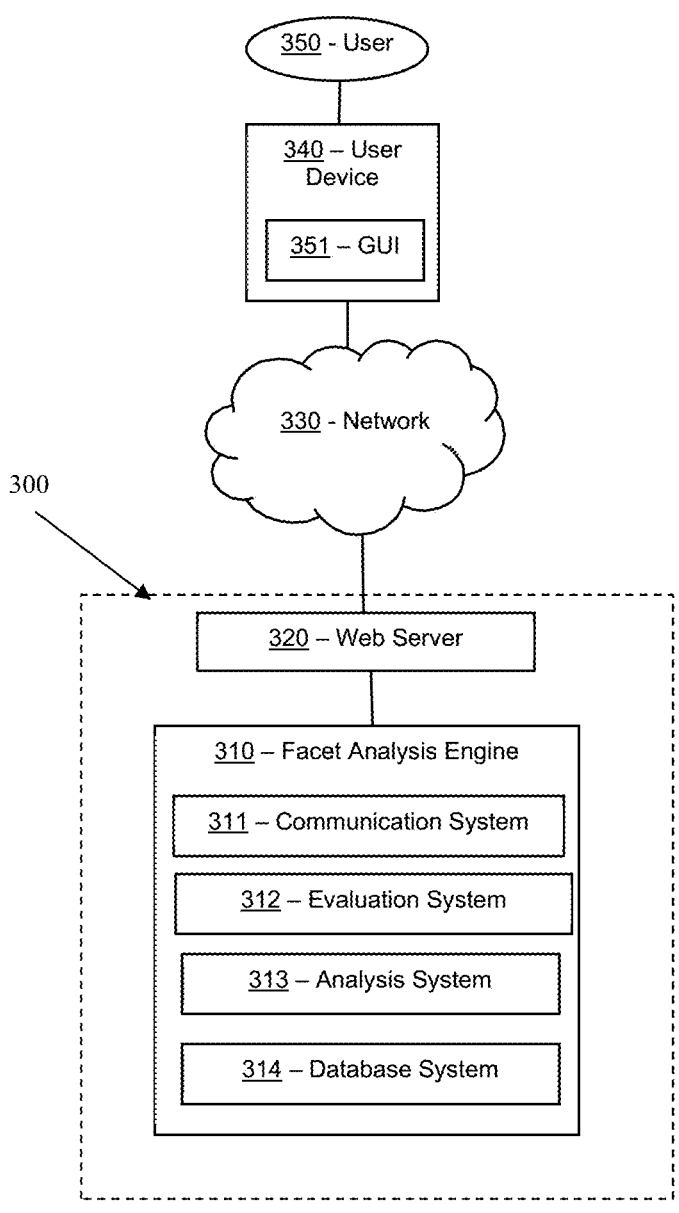
FIG. 3 illustrates a representative block diagram of a system, according to an embodiment.

Turning ahead in the drawings, FIG. 3 illustrates a block diagram of a system 300 that can be employed for facet analysis, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a facet analysis engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Facet analysis engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host facet analysis engine 310 and/or web server 320. Additional details regarding facet analysis engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with facet analysis engine 310, in addition to other suitable activities. In a number of embodiments, web server 320 can interface with facet analysis engine 310 when a user (e.g., 350) is viewing infrastructure components in order to assist with the analysis of the infrastructure components.

In some embodiments, an internal network that is not open to the public can be used for communications between facet analysis engine 310 and web server 320 within system 300. Accordingly, in some embodiments, facet analysis engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, facet analysis engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to facet analysis engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of facet analysis engine 310 and/or web server 320. In a similar manner, the processors and/or the non-transitory computer-readable media can be local and/or remote to each other.

Meanwhile, in many embodiments, facet analysis engine 310 and/or web server 320 also can be configured to communicate with one or more databases, such as a database system 314. The one or more databases can include product catalog information, user engagement information, facet information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, facet analysis engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, facet analysis engine 310 can include a communication system 311, an evaluation system 312, an analysis system 313, and/or database system 314. In many embodiments, the systems of facet analysis engine 310 can be modules of computing instructions (e.g., software modules) stored at non-transitory computer readable media that operate on one or more processors. In other embodiments, the systems of facet analysis engine 310 can be implemented in hardware. Facet analysis engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host facet analysis engine 310 and/or web server 320. Additional details regarding facet analysis engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user devices 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, facet analysis engine 310, and/or web server 320 can be configured to communicate with one or more user devices 340. In some embodiments, user devices 340 also can be referred to as customer computers. In some embodiments, facet analysis engine 310, and/or web server 320 can communicate or interface (e.g., interact) with one or more customer computers (such as user devices 340) through a network 330. Network 330 can be an intranet that is not open to the public. In further embodiments, network 330 can be a mesh network of individual systems. Accordingly, in many embodiments, facet analysis engine 310, and/or web server 320 (and/or the software used by such systems) can refer to a back end of system 300 operated by an operator and/or administrator of system 300, and user device 340 (and/or the software used by such systems) can refer to a front end of system 300 used by one or more users 350, respectively. In some embodiments, users 350 can also be referred to as customers, in which case, user device 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as facet analysis engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving a first set of facet information corresponding to a first marketplace and a second set of facet information corresponding to a second marketplace. In some embodiments, the first set of facet information includes the following: a product catalog for the first marketplace, engagement data for the first marketplace, facet rules for the first marketplace. In some embodiments, the engagement data for the first marketplace can include facet clickstream data, add-to-cart data, and transaction data. In some embodiments, the second set of facet information includes a whitelist of facets for the second marketplace. In some embodiments, the whitelist is a list of facets approved by an operator. For example, the first marketplace can be a first country and the second marketplace can be a second country. In some embodiments, the second country can have a listing of facets that are approved by an operator. Embodiments disclosed herein can utilize the first set of facet information and the second set of facet information to build and train a machine learning model to improve facet identification and curation.

In many embodiments, method 400 can comprise an activity 420 of analyzing the first set of facet information to reduce a number of attributes to process. In some embodiments, activity 420 can include analyzing the second set of facet information.

In some embodiments, activity 420 can include determining a stock keeping unit (SKU) coverage score for each facet in the first set of facet information. In some embodiments, determining the SKU coverage score includes using an equation comprising:

$$\text{score}_{coverage}(f) = \frac{\text{number of } SKUs \text{ with facet } f}{\text{total number of } SKUs \text{ in category } L}$$

In some embodiments, the SKU coverage score corresponds to a percentage of products to which a facet is applicable. If the SKU coverage score for a particular facet is below a threshold, the facet can be removed from further processing. In some embodiments, the SKU score is utilized in a machine learning model as a feature for performing facet ranking.

In some embodiments, activity 420 can include determining a cardinality value for each facet in the first set of facet information.

In some embodiments, determining the cardinality value includes using an equation comprising:

$$\text{score}_{valueCard}(f) = \begin{cases} 0 & \text{if } c_f < \text{min}Card \\ e^{\frac{c_f - optCard}{\theta^2}} & \text{if } \text{min}Card \le c_f \le optCard \\ \frac{s}{1 + (c_f - optCard)} & \text{if } c_f > optCard \end{cases}$$

where $c_f$ corresponds to a number of facet values, optCard corresponds to an optimal number of facet values, minCard corresponds to a minimum number of facet values, and s corresponds to a scale constant that controls a slope of decay after optCard. In some embodiments, the cardinality score corresponds to a number of facet values (e.g., attributes) under a facet. For example, if a cardinality score for a facet does not satisfy a threshold (e.g., is below the minimum cardinality (i.e., minCard)) the facet can be removed from further processing. In some embodiments, the cardinality value is utilized in a machine learning model as a feature for performing facet ranking.

In some embodiments, activity 420 can include determining a facet value dispersion for each facet in the first set of facet information. In some embodiments, determining the facet value dispersion includes using an equation comprising:

$$\text{score}_{sizeDispersion}(f) = \frac{1}{1 + sizeVar(f)} \quad sizeVar(f) = \frac{\sqrt{\frac{1}{N} \times \sum_{i=1}^{N} (x_i - \bar{x})^2}}{\bar{x}}$$

where N corresponds to the number of facet values, $x_i$ corresponds to the $i^{th}$ facet value size (i.e., the number of products under the $i^{th}$ facet value) and x corresponds to the average facet value size. In some embodiments, the facet value dispersion corresponds to a balance of the facet value corresponding to each facet. If the facet value dispersion for a particular facet does not satisfy a threshold, the facet can be removed from further processing. In some embodiments, the facet value dispersion is utilized in a machine learning model as a feature for performing facet ranking.

In some embodiments, activity 420 can include filtering the remaining facets based on engagement data. For example, facet clickstream data for each facet can be aggregated for a particular time window (e.g., 30 days, 60 days, 90 days, etc.). In some embodiments, summary metrics can be determined based on the engagement data. For example, the summary metrics for each facet can include a maximum number of clicks, a minimum number of clicks, a square root mean number of clicks, and a mean number of clicks. Based on the summary metrics, low performing facets can be removed from further processing. For example, facets that have less than 5 maximum clicks in the past 30 days are removed from further processing. In some embodiments, these aggregated values are used in a machine learning model as features for performing facet ranking. In some embodiments, a pivot date can be selected so that the engagement data between the pivot date and the present is used to construct the target of the machine learning-based facet ranking model, whereas the engagement data in the previous time windows is used to compute the features.

In many embodiments, method 400 can comprise an activity 430 of building a machine learning model to map candidate facets from the first set of facet information to facets from the second set of facet information. In some embodiments, building the machine learning model can include creating a taxonomy mapping between category and product types or any other taxonomy structure by selecting a threshold number of product types or any other taxonomy structure by percentage product count for each category. In some embodiments, the first set of facet information can include a category and the second set of facet information can include product types or any other taxonomy structure and a potential whitelist of facet values. In some embodiments, building the machine learning model can include selecting the 3 product types with the highest percentage product count for each category. Turning briefly to FIG. 5, an exemplary data relationship 500 is illustrated. The data relationship 500 illustrates the categories from the first set of facet information (e.g., LA category from Canada marketplace), the top 3 product types with the highest percentage for this category in the second set of facet information (e.g., the United States marketplace), and the potential whitelist of facets for these product types. For example, the taxonomy of the first marketplace can follow a hierarchical structure: L1 category→L2 category→L3 category→L4 category. In FIG. 5, the Canada L4 category "Computer Desks" is mapped to a U.S. Product Type, where the L4 category "Computer Desks" is a child category under L1 category "Furniture"→L2 category "Office Furniture"→L3 category "Desks" as illustrated by the ">" sign in the figure. Each of the top 3 U.S. Product Types selected will have a list of whitelisted facets, and the potential whitelist is formed by taking the union and deduplicating the whitelisted facets from the second marketplace (U.S.).

In some embodiments, the facets can have different names across different marketplaces. Embodiments disclosed herein can determine similarity functions to correlate between different facets that have different names. In some embodiments, the similarity functions can include a Bigram Jaccard similarity, edit-distance based measures, a Monge-Elkan similarity, and a cosine similarity of word embeddings of the facets. The facets can also be in different languages, in which case we can apply a translation layer to first translate the facets from the second marketplace to the language used by the facets in the first marketplace, and then calculate the similarity scores.

In some embodiments, building the machine learning model can include determining the Bigram Jaccard similarity using an equation comprising:

$$sim_{jaccard}(S_a, S_b) = \frac{|S_a \cap S_b|}{|S_a \cup S_b|} = \frac{|S_a \cap S_b|}{|S_a| + |S_b| - |S_a \cap S_b|}$$

where a corresponds to a facet in the first set of facet information, b corresponds to a facet in the second set of facet information, $S_a$ corresponds to a set of bigrams constructed from string a, and $S_b$, corresponds to a set of bigrams constructed from string b. The Bigram Jaccard similarity function can be utilized to determine spelling resemblance. In some embodiments, the Bigram Jaccard similarity can be an n-gram Jaccard similarity which includes Bigram, Trigram, etc. In this embodiment, the Bigram Jaccard similarity equation disclosed above will remain the same, but $S_a$ corresponds to a set of n-grams constructed from string a, and $S_b$ corresponds to a set of n-grams constructed from string b. The n-grams can be constructed at the character-level, at the token-level (where the tokens are split by using tokenizers such as Byte-Pair Encoding, WordPiece, etc.) or at the word-level.

In some embodiments, building the machine learning model can include determining the Monge-Elkan similarity using an equation comprising:

$$sim_{MongeElkan}(a, b) = \frac{1}{|a|} \sum_{i=1}^{|a|} \max_{j=1,\dots,|b|} \{sim_{inter}(a_i, b_j)\}$$

where |a| and |b| are the number of tokens contained in string a and b respectively, $a_i$ corresponds to the $i^{th}$ token in a, and $b_j$ corresponds the $j^{th}$ token in b.

In some embodiments, the Monge-Elkan similarity function computes the average of the similarity values between similar token pairs based on an inter-token similarity measure $sim_{inter}$ (e.g., the Levenshtein similarity).

In some embodiments, building the machine learning model can include determining the cosine similarity using an equation comprising:

$$sim_{cosine} = \frac{\vec{u} \cdot \vec{v}}{\|\vec{u}\| \|\vec{v}\|} = \frac{\sum_{i=1}^{n} u_i v_i}{\sqrt{\sum_{i=1}^{n} u_i^2} \sqrt{\sum_{i=1}^{n} v_i^2}}$$

where u and v correspond to word embeddings with the same dimension (e.g., the pre-trained GloVe vectors with 300 dimensions) corresponding respectively to string a and b. In some embodiments, word embeddings can come from the GloVe vectors, word2vec, DistilBERT or any other large language models (LLMs) such as ChatGPT, LLaMa and PaLM-E. The embedding vectors can have any number of dimensions, such as 50, 100, 200, 300 dimensions for GloVe or word2vec, and 128, 256, 768 dimensions for DistilBERT or any other LLMs. The embeddings can be pre-trained or fine-tuned on custom datasets.

In some embodiments, activity 430 can include determining a facet candidate score that corresponds to a likelihood of a match between a candidate facet and a facet in another marketplace. In some embodiments, the facet candidate score can be determined using an equation comprising:

$$score_{MongeElkan}(a) = \max_{b \in \{potential\ whitelist\}} sim_{MongeElkan}(a, b)$$

where a corresponds to a candidate facet, and b corresponds to a facet in another marketplace.

In many embodiments, method 400 can comprise an activity 440 of training the machine learning model to perform facet ranking. In some embodiments, activity 440 can include training the machine learning model based on the features created in activity 420 and activity 430 using the first set of facet information, the second set of facet information, and the mapping of candidate facets from the first set of facet information to facets from the second set of facet information.

In some embodiments, training the machine learning model can include performing data preprocessing to normalize all features to [0, 1] based on OneHot encoded categorical variables. In some embodiments, training the machine learning model can include training a Sparse Group Lasso (SGL) model. For example, a separate model can be trained for each category. In some embodiments, one SGL model can be trained on the entire dataset. In other embodiments, a separate SGL model can be trained for each category. Although an exemplary implementation herein describes the use of SGL, other machine learning models including random forest, gradient boosting, deep feedforward neural networks can be used as alternatives. In some embodiments, the SGL model can re-rank the facets based on predicted scores.

In some embodiments, the target of the machine learning model can be a utility score comprising:

$$\text{Utility Score} = \beta_0 + \beta_1 * x_1 + \ldots + \beta_n * x_n$$

where $x_1, \ldots, x_n$ creates an output space which is optimized jointly through the linear composition of the utility function. Embodiments disclosed herein can also create individual models based on training objectives $x_1, x_2, \ldots x_n$ (e.g., the click-through-rate, add-to-cart rate, conversion rate in the most recent time period, etc.) and aggregate the final predictions given by individual models using an ensemble-based approach. As an example, the utility score can be determined using an equation comprising:

$$\text{Utility Score} = 30\text{-day click-through-rate} + .5 * \text{score}_{MongeElkan}$$

In some embodiments, training the machine learning model can include implementing hyper parameter tuning based on a grid search, random search, or Bayesian optimization of within-group and between-group shrinkage parameters. In some embodiments, the hyper parameter tuning can include running 5-fold cross validation with a scoring metric.

Figure 8:
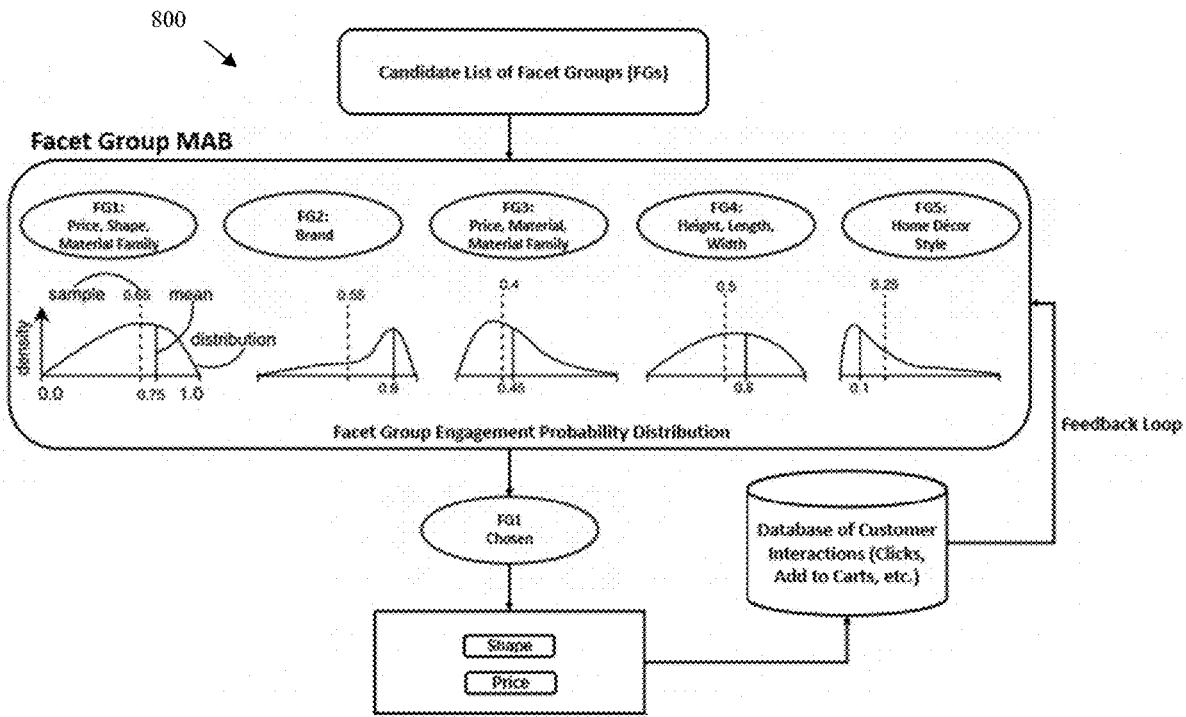
FIG. 8 illustrates an exemplary implementation of an explore-exploit mechanism using a multi-armed bandit, according to certain embodiments.

In some embodiments, for facets that do not have engagement data, an explore-exploit approach using multi-armed bandit class of reinforcement learning models can be implemented, in order to display those facets that have no or low engagement while simultaneously maximizing the long-term objective of improving overall user engagement. For example, the facet ranking from the SGL model can be used as a warm start. In some embodiments, each arm is a facet group consisting of multiple facets and deduplication can be performed on the facet groups. In some embodiments, the explore-exploit is done using multi-armed bandit-based learning model which implements an Upper Confidence Bound algorithm, a Bayesian Bandit with Thompson Sampling, or any other appropriate variant. Yet in other embodiments, the multi-armed bandit approach can be contextualized, that is personalized to a user context using the user's historical facet engagement traits and current browsing context (e.g., selections of facet values in the current browse session), so that the user's preferences of browse facets are dynamically selected and displayed in a personalized manner. Turning briefly to FIG. 8, an exemplary explore-exploit implementation 800 is illustrated according to certain embodiments. The illustrated embodiment of FIG. 8 corresponds to an L4 category "Computer Desks", and a candidate ranked list of Facet Groups has been generated after performing the activity 440 (FIG. 4). In the illustrated embodiment, each Facet Group contains 1 or more facets and has a different probability of being engaged by the users. In some embodiments, different Facet Groups are allowed to contain common facets. For example, a candidate ranked list of individual facets can have a size of each Facet Group that is exactly 1 (e.g., each Facet Group contains a single facet). However, any number of sizes for each Facet Group can be utilized. In the illustrated example of FIG. 8, the following facet groups are utilized: Facet Group 1=[Price, Shape, Material Family], FG1 contains 3 relevant facets whose joint engagement probability is denoted by P1=0.75; Facet Group 2=[Brand], FG2 contains a single relevant facet with engagement probability P2=0.9; Facet Group 3=[Price, Material, Material Family], FG3 contains 2 common facets as FG1 but the third facet "Material" overlaps with the facet "Material Family", therefore FG3 is not as helpful to the user as FG1 and the engagement probability P3=0.45; Facet Group 4=[Height, Length, Width] with P4=0.6; and Facet Group 5=[Home Décor Style] with P5=0.1 because this facet is marginally relevant to the LA category "Computer Desks".

In the illustrated example of FIG. 8, the Multi-Armed Bandit (MAB) algorithm samples the probability distributions, and in this example, the sampled values for each Facet Groups are respectively: Q1=0.65, Q2=0.55, Q3=0.4, Q4=0.5 and Q5=0.25. Among the sampled values, the Multi-Armed Bandit algorithm picks the arm corresponding to the maximum of the sampled values (here FG1 with sampled value Q1=0.65), thereby, balancing exploration versus exploitation, as opposed to a greedy choice of the maximum of the mean values of the distributions (here FG2 with engagement probability P2=0.9). In some embodiments, each slot on the final facet list is displayed to a user and is filled with a subset of the Facet Group selected using the same approach mentioned above; in other words, one more MAB is used to select the relevant facet or facets from the Facet Group selected earlier (see FIG. 9). The user engagement with the facet list, as well as clicks, cart additions or transactions on the filtered search results following the facet click are used as feedback signals for updating the engagement probability distribution of each Facet Group and individual facets in the Facet Group.

Figure 9:
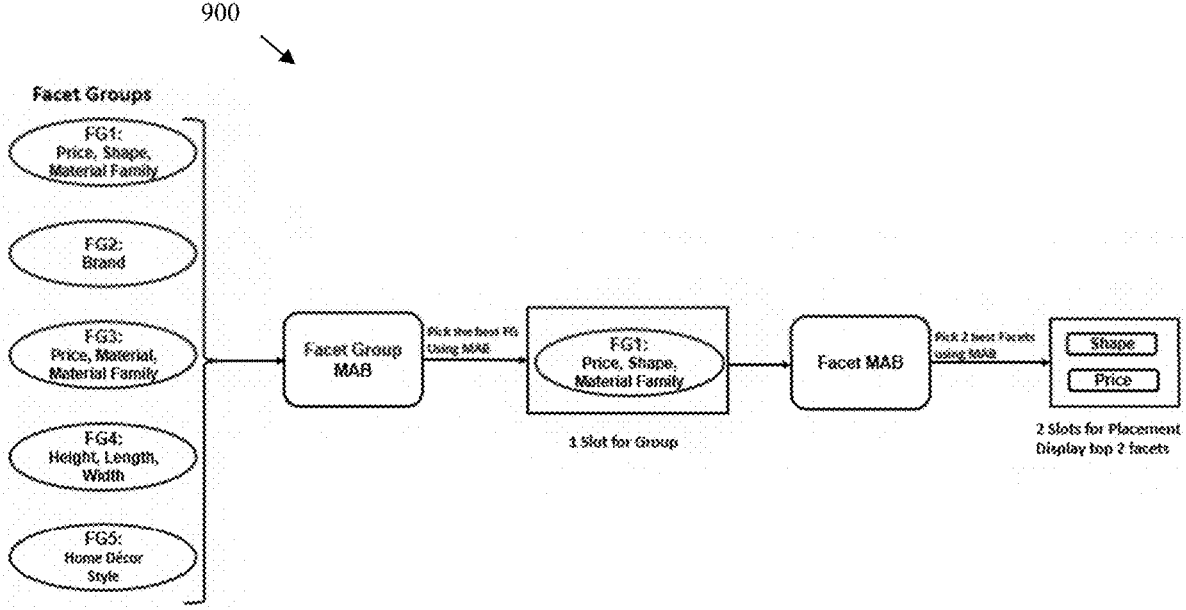
FIG. 9 illustrates an exemplary hierarchical implementation of the explore-exploit mechanism using a group of multi-armed bandits, according to certain embodiments.

Turning briefly to FIG. 9, a hierarchical implementation of a Multi-Armed Bandit 900 is illustrated. In the illustrated embodiment, at a first stage of the Hierarchical Implementation of Multi-Armed Bandits, the Facet Group with the maximum sampled value is picked, and FG1 is granted one slot on the final display. In the illustrated embodiment, at a second stage, the individual facets in FG1 are selected and re-ordered using MAB, and the top 2 best facets "Shape" and "Price" are assigned to two available individual placements slots and are displayed to the user.

Figure 6:
FIG. 6 illustrates a graphical user interface and an updated graphical user interface, according to certain embodiments.

Returning to FIG. 4, in many embodiments, method 400 can comprise activity 450 of displaying a selected number of re-ranked facets based on an output from the machine learning model. For example, activity 450 can include modifying a GUI to display facets based on the machine learning model. Turning briefly to FIG. 6, a first GUI 600 is illustrated that can be displayed prior to activities 410-440. FIG. 6 also illustrates an updated GUI 602 that includes updated facets that were determined to be relevant based on the outputs of the machine learning model. In the illustrated embodiment of FIG. 6, each cell displayed in FIG. 6 (e.g., "Style") is a "facet". Each "facet" can have multiple "facet values" (or "attributes"), e.g., the "Style" can be "Modern", "Industrial", "Contemporary", etc. Each "facet value" may have a different facet value size (i.e., the number of products associated with each facet value). For example, "Modern (377)" means 377 products in the LA category Computer Desks have the "Modern Style".

Figure 7:
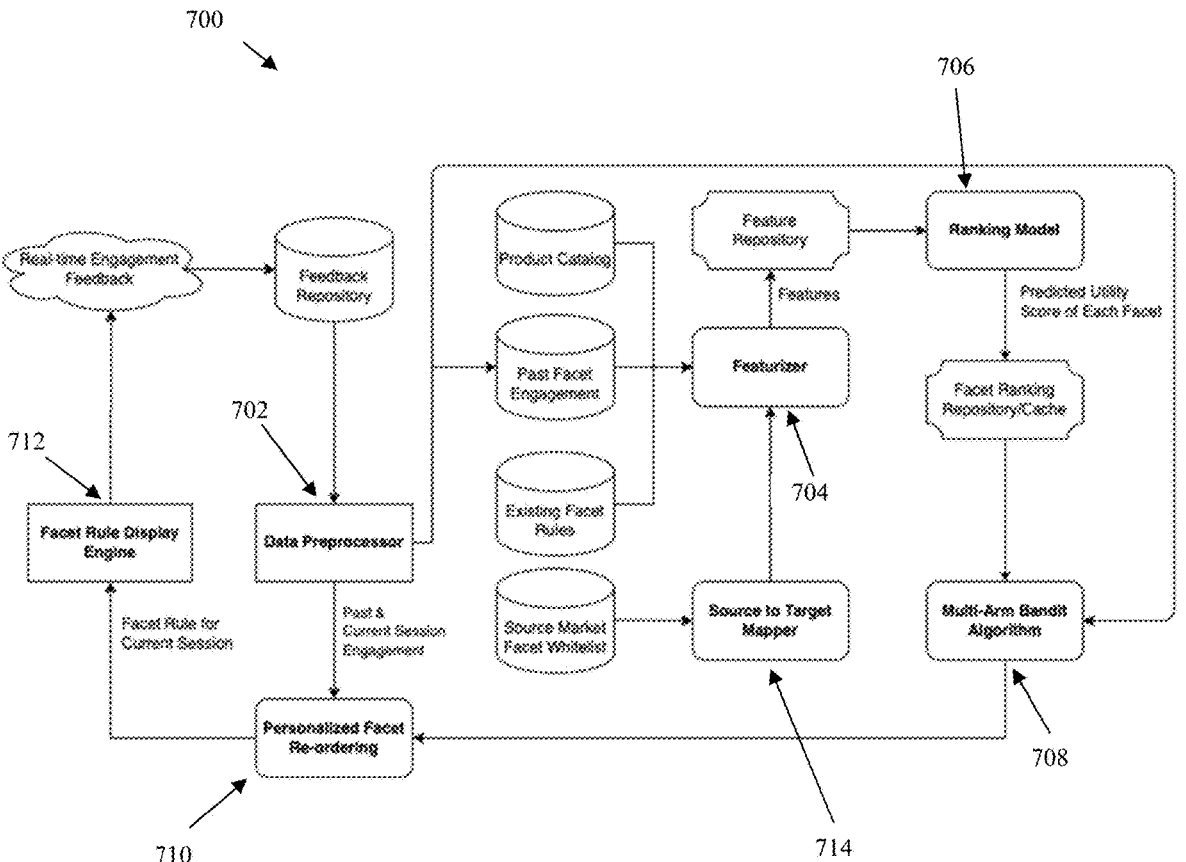
FIG. 7 illustrates an exemplary system architecture, according to certain embodiments.

FIG. 7 illustrates an exemplary system architecture 700 that can be utilized to implement method 400 (FIG. 4). The system architecture includes a data preprocessor 702, a featurizer 704, a ranking model 706, a multi-arm bandit algorithm 708, a personalized facet re-ordering 710, a facet rule display engine 712, and a source to target mapper 714. During the offline training process, past user feedback for the first marketplace is stored in the feedback repository (e.g., facet clickstream data, add-to-cart data, and transaction data) and is cleaned by the data preprocessor 702. The first set of facet information corresponding to a first marketplace and a second set of facet information corresponding to a second marketplace are passed to the featurizer 704 to generate features and reduce a number of attributes to process through activity 420 (FIG. 4). In some embodiments, the first set of facet information includes the following: a product catalog for the first marketplace, engagement data for the first marketplace, facet rules for the first marketplace. In some embodiments, the second set of facet information includes a whitelist of facets for the second marketplace. The features created through activity 420 (FIG. 4) are stored in a feature repository and are used by the facet ranking model 706 to predict a utility score as in activity 440 (FIG. 4). The facets are ranked based on an output from the machine learning model and are passed to the multi-armed bandit-based learning model 708 and personalization module 710 for real-time re-ordering. For the current user session, a selected number of re-ranked facets will be transmitted via the facet rule display engine 712 displayed through activity 450. In some embodiments, the facets are ranked according to the output from the machine learning model which ranks based on the semantic relevance and historical engagement, using a Learning-To-Rank method with the aforementioned utility function as the learning objective. In some embodiments, the ranked facets are passed to the multi-armed bandit-based explore-exploit model, in 708, which is a reinforcement learning-based mechanism to further optimize the ranked facets for better long-term customer engagement, based on real-time customer interactions. In some embodiments, the personalization module 710, along with 708, uses the current user session, to optimize the rankings so that an optimally re-ranked list of facets will be transmitted by the facet rule display engine 712 and displayed through activity 450.

Returning to FIG. 3, in several embodiments, communication system 311 can at least partially perform activity 410 (FIG. 4), and/or activity 450 (FIG. 4).

In several embodiments, evaluation system 312 can at least partially perform activity 420 (FIG. 4), and/or activity 430 (FIG. 4).

In a number of embodiments, analysis system 313 can at least partially perform activity 440 (FIG. 4).

In a number of embodiments, web server 320 can at least partially perform method 400.

Although systems and methods for facet analysis have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

While embodiments disclosed herein disclose a facet intelligence framework primarily in the browse context, embodiments disclosed herein can be extended to search with minor modifications. For example, given a query, embodiments disclosed herein can extract all available attributes of the products in the recall set and implement a method similar to method 400 (FIG. 4) to generate the facet rules. Alternatively, most eCommerce sites have a query understanding module that classifies each query to corresponding browse categories. Based on the browse categories from the query module, embodiments disclosed herein can implement the method 400 to determine facets for the search query. In this embodiment, after curating the ranked facet lists by category, embodiments disclosed herein can display the browse facets of the top predicted categories of a query.

E-commerce businesses are comprised of stored products that can be browsed and sold, and showing those products with correct relevance in response to a user's query is important. However, when the scale of such stored products is in millions, it becomes hard for an online retailer to retrieve a focused set of products that best satisfies a user's needs. Embodiments disclosed herein are directed to a machine learning model that can determine and display facets in a navigation panel of an e-commerce website, giving customers the flexibility to narrow down their options based on certain criteria.

The traditional approach to facet curation typically involves manual efforts by category experts who select the appropriate facets and determine their relative ordering for each browse page or search query. Nevertheless, for a large e-commerce platform, this approach can be labor-intensive and non-sustaining not only due to its wide array of products, but also because the facets have to be updated to keep up with the latest changes in a product catalog or to reflect any new trends in customer behavior. As a result, it is difficult for most markets, which are relatively resource-constrained, to utilize this traditional approach. Even if manual curation has been carried out in some markets, it is difficult to map the facets in these markets to others due to differences in catalog and languages, e.g., English versus French, or even minor changes due to different locales, e.g., color (U.S.) versus Colour (Canada). Embodiments disclosed herein are directed to improving the technical field of facet curation across different markets and languages.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
one or more processors; and
one or more non-transitory computer-readable media storing computing instructions that, when executed on the one or more processors, perform:
  receiving a first set of facet information corresponding to a first online marketplace, the first set of facet information comprising first facets of the first online marketplace;
  receiving a second set of facet information corresponding to a second online marketplace, the second set of facet information comprising second facets for the second online marketplace;
  analyzing the first set of facet information to reduce a number of the first facets as candidate facets;
  building a machine learning model to map candidate facets to the second facets from the second set of facet information by determining, for each candidate facet, a facet candidate score indicative of a similarity between the candidate facets and the second facets, wherein the facet candidate scores are determined using one or more similarity functions comprising one or more of a n-gram Jaccard similarity based on tokenizing the candidate and second facets into tokens and constructing n-grams by splitting the tokens, an edit-distance based measure, a Monge-Elkan similarity that computes an average similarity between similar token pairs using an inter-token similarity measure, and a cosine similarity of word embeddings constructed from the candidate and second facets;
  training the machine learning model to perform facet ranking on the candidate facets and second facets using the first set of facet information, the second set of facet information, and the mapping of the candidate facets to the second facets to a curated set of factors for the first online marketplace; and
  displaying, on a navigation panel of a graphical user interface, a selected number of ranked facets as a curated set of facets for the first online marketplace, the navigation panel comprising one or more of the first facets and one or more of the second facets that are selected based on the facet ranking limited number of facet display positions.

2. The system of claim 1, wherein the first set of facet information comprises: a product catalog for the first marketplace, engagement data for the first marketplace, and facet rules for the first marketplace.

3. The system of claim 1, wherein the second set of facet information comprises a whitelist of facets for the second marketplace.

4. The system of claim 1, wherein analyzing the first set of facet information further comprises:
  determining a respective stock keeping unit (SKU) coverage score for each facet in the first set of facet information; and
  determining a respective cardinality value for each facet in the first set of facet information; and
  determining a respective facet value dispersion for each facet in the first set of facet information.

5. The system of claim 4, wherein determining the respective SKU coverage score includes using an equation comprising:

$$score_{coverage}(f) = \frac{\text{number of } SKUs \text{ with facet } f}{\text{total number of } SKUs \text{ in category } L}.$$

6. The system of claim 4, wherein determining the respective cardinality value includes using an equation comprising:

$$score_{valueCard}(f) = \begin{cases} 0 & \text{if } c_f < minCard \\ e^{\frac{c_f - optCard}{\theta^2}} & \text{if } minCard \le c_f \le optCard \\ \frac{s}{1 + (c_f - optCard)} & \text{if } c_f > optCard \end{cases}$$

where $c_f$ corresponds to a number of facet values, optCard corresponds to an optimal number of facet values, minCard corresponds to a minimum number of facet values, and s corresponds to a scale constant that controls a slope of decay after optCard.

7. The system of claim 4, wherein determining the respective facet value dispersion includes using an equation comprising:

$$score_{sizeDispersion}(f) = \frac{1}{1 + sizeVar(f)}, \quad sizeVar(f) = \frac{\sqrt{\frac{1}{N} \times \sum_{i=1}^{N} (x_i - \bar{x})^2}}{\bar{x}}$$

where N corresponds to the number of facet values, $x_i$ corresponds to the $i^{th}$ facet value size (i.e., the number of products under the $i^{th}$ facet value) and x corresponds to the average facet value size.

8. The system of claim 1, wherein building the machine learning model further comprises:
  determining the n-gram Jaccard similarity;
  determining the edit-distance based measures;
  determining the Monge-Elkan similarity;
  determining the cosine similarity of word embeddings; and
  determining the facet candidate score.

9. The system of claim 8, wherein the n-gram Jaccard similarity comprises a Bigram Jaccard similarity, and wherein determining the Bigram Jaccard similarity includes using an equation comprising:

$$sim_{jaccard}(S_a, S_b) = \frac{|S_a \cap S_b|}{|S_a \cup S_b|} = \frac{|S_a \cap S_b|}{|S_a| + |S_b| - |S_a \cap S_b|}$$

where a corresponds to a facet in the first set of facet information, b corresponds to a facet in the second set of facet information, $S_a$ corresponds to a set of bigrams constructed from string a, and $S_b$ corresponds to a set of bigrams constructed from string b.

10. The system of claim 8, wherein determining the Monge-Elkan similarity includes using an equation comprising:

$$sim_{MongeElkan}(a, b) = \frac{1}{|a|} \sum_{i=1}^{|a|} \max_{j=1,\ldots,|b|} \{sim_{inter}(a_i, b_j)\}$$

where |a| and |b| are the number of tokens contained in string a and b respectively, ai corresponds to the $i^{th}$ token in a, and $b_j$ corresponds the $j^{th}$ token in b.

11. A method implemented via execution of computing instructions configured to run at one or more processors and configured to be stored at non-transitory computer-readable media, the method comprising:

receiving a first set of facet information corresponding to a first online marketplace, the first set of facet information comprising first facets of the first online marketplace;

receiving a second set of facet information corresponding to a second online marketplace, the second set of facet information comprising second facets for the second online marketplace;

analyzing the first set of facet information to reduce a number of the first facets as candidate facets;

building a machine learning model to map candidate facets to the second facets from the second set of facet information by determining, for each candidate facet, a facet candidate score indicative of a similarity between the candidate facets and the second facets, wherein the facet candidate scores are determined using one or more similarity functions comprising one or more of a n-gram Jaccard similarity based on tokenizing the candidate and second facets into tokens and constructing n-grams by splitting the tokens, an edit-distance based measure, a Monge-Elkan similarity that computes an average similarity between similar token pairs using an inter-token similarity measure, and a cosine similarity of word embeddings constructed from the candidate and second facets;

training the machine learning model to perform facet ranking on the candidate facets and second facets using the first set of facet information, the second set of facet information, and the mapping of the candidate facets to the second facets to a curated set of factors for the first online marketplace; and displaying, on a navigation panel of a graphical user interface, a selected number of ranked facets as a curated set of facets for the first online marketplace, the navigation panel comprising one or more of the first facets and one or more of the second facets that are selected based on the facet ranking limited number of facet display positions.

12. The method of claim 11, wherein the first set of facet information comprises: a product catalog for the first marketplace, engagement data for the first marketplace, and facet rules for the first marketplace, and wherein the second set of facet information comprises a whitelist of facets for the second marketplace.

13. The method of claim 11, wherein analyzing the first set of facet information further comprises:

determining a respective stock keeping unit (SKU) coverage score for each facet in the first set of facet information; and determining a respective cardinality value for each facet in the first set of facet information; and determining a respective facet value dispersion for each facet in the first set of facet information.

14. The method of claim 13, wherein determining the respective SKU coverage score includes using an equation comprising:

$$score_{coverage}(f) = \frac{\text{number of } SKUs \text{ with facet } f}{\text{total number of } SKUs \text{ in category } L}.$$

15. The method of claim 13, wherein determining the respective cardinality value includes using an equation comprising:

$$score_{valueCard}(f) = \begin{cases} 0 & \text{if } c_f < minCard \\ e^{\frac{c_f - optCard}{\theta^2}} & \text{if } minCard \le c_f \le optCard \\ \frac{s}{1 + (c_f - optCard)} & \text{if } c_f > optCard \end{cases}$$

where $c_f$ corresponds to a number of facet values, optCard corresponds to an optimal number of facet values, minCard corresponds to a minimum number of facet values, and s corresponds to a scale constant that controls a slope of decay after optCard.

16. The method of claim 13, wherein determining the respective facet value dispersion includes using an equation comprising:

$$score_{sizeDispersion}(f) = \frac{1}{1 + sizeVar(f)} \quad sizeVar(f) = \frac{\sqrt{\frac{1}{N} \times \sum_{i=1}^{N} (x_i - \bar{x})^2}}{\bar{x}}$$

where N corresponds to the number of facet values, $x_i$ corresponds to the $i^{th}$ facet value size (i.e., the number of products under the $i^{th}$ facet value) and x corresponds to the average facet value size.

17. The method of claim 11, wherein building the machine learning model further comprises:

determining the n-gram Jaccard similarity;

determining the edit-distance based measures;

determining the Monge-Elkan similarity;

determining the cosine similarity of word embeddings; and determining the facet candidate score.

18. The method of claim 17, wherein the n-gram Jaccard similarity comprises a Bigram Jaccard similarity, and wherein determining the Bigram Jaccard similarity includes using an equation comprising:

$$sim_{jaccard}(S_a, S_b) = \frac{|S_a \cap S_b|}{|S_a \cup S_b|} = \frac{|S_a \cap S_b|}{|S_a| + |S_b| - |S_a \cap S_b|}$$

where a corresponds to a facet in the first set of facet information, b corresponds to a facet in the second set of facet information, $S_a$ corresponds to a set of bigrams constructed from string a, and $S_b$ corresponds to a set of bigrams constructed from string b.

19. The method of claim 17, wherein determining the Monge-Elkan similarity includes using an equation comprising:

$$sim_{MongeElkan}(a, b) = \frac{1}{|a|} \sum_{i=1}^{|a|} \max_{j=1, \ldots, |b|} \{sim_{inter}(a_i, b_j)\}$$

where |a| and |b| are the number of tokens contained in string a and b respectively, ai corresponds to the $i^{th}$ token in a, and $b_j$ corresponds the $j^{th}$ token in b.

20. The system of claim 1, wherein the machine learning model comprises one or more Sparse Group Lasso models trained on a utility score that is based on user engagement data and the one or more similarity functions.

\* \* \* \* \*